(12) United States Patent
Jones et al.

(10) Patent No.: US 8,545,354 B2
(45) Date of Patent: Oct. 1, 2013

(54) METHOD AND APPARATUS FOR HYDRAULICALLY DEACTIVATING A TORQUE TRANSFER CLUTCH

(75) Inventors: Gary L. Jones, Farmington Hills, MI (US); Farzad Samie, Franklin, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 339 days.

(21) Appl. No.: 12/984,821

(22) Filed: Jan. 5, 2011

(65) Prior Publication Data

US 2012/0168238 A1 Jul. 5, 2012

(51) Int. Cl.
*F16D 19/00* (2006.01)
*F16D 21/00* (2006.01)
*F16H 31/00* (2006.01)

(52) U.S. Cl.
USPC ............................................ 475/140; 192/83

(58) Field of Classification Search
USPC ................. 475/140; 192/83, 85.37, 85.38
See application file for complete search history.

(56) References Cited

U.S. PATENT DOCUMENTS

| | | | |
|---|---|---|---|
| 3,098,550 A * | 7/1963 | Schwab | 192/48.613 |
| 6,892,869 B2 | 5/2005 | Ookita et al. | |
| 8,201,678 B2 * | 6/2012 | Samie et al. | 192/85.37 |
| 8,210,979 B2 * | 7/2012 | Jones et al. | 475/140 |
| 8,409,053 B2 * | 4/2013 | Samie et al. | 477/5 |
| 2007/0261932 A1 | 11/2007 | Zagrodzki et al. | |

OTHER PUBLICATIONS

U.S. Appl. No. 12/754,048, filed Apr. 5, Samie, et al.

* cited by examiner

*Primary Examiner* — Tisha Lewis (57) ABSTRACT

A torque transfer apparatus for a transmission includes a rotatable friction clutch pack including a first friction plate that is contiguous to a second friction plate, with the first friction plate coupled to a first transmission element and the second friction plate coupled to a second transmission element. A Belleville spring device is configured to urge the first friction plate to engage the second friction plate to effect torque transfer therebetween when a hydraulically-activated piston is deactivated. The hydraulically-activated piston is configured to urge the second periphery of the Belleville spring device away from mechanical contact of the first friction plate when the hydraulically-activated piston is activated.

12 Claims, 6 Drawing Sheets

METHOD AND APPARATUS FOR HYDRAULICALLY DEACTIVATING A TORQUE TRANSFER CLUTCH

TECHNICAL FIELD

This disclosure is related to transmission clutch activation.

BACKGROUND

The statements in this section merely provide background information related to the present disclosure and may not constitute prior art.

Known powertrain systems include engines mechanically coupled to transmission devices to generate and transfer torque to an output member. Known transmission devices include friction clutch packs that transfer torque when activated. Known mechanisms include hydraulically actuated pistons that use hydraulic pressure to apply normal force to a clutch apply plate to engage contiguous clutch plates, thus activating a friction clutch pack to transfer torque. Known engine systems for hybrid powertrain systems use autostop and autostart events to discontinue engine operation during ongoing powertrain operation to conserve fuel. Known powertrain systems use hydraulic pumps to provide pressurized hydraulic fluid to transmission devices to activate and deactivate friction clutch packs to transfer torque. Known hydraulic pumps are mechanically driven by the engine or electrically driven by electric motors. When an engine is shut down in response to an autostop event, a mechanically-driven hydraulic pump is also shut down. It is known to use an electrically-driven auxiliary hydraulic pump to provide hydraulic pressure for clutch activation when an engine is shut down in response to an autostop event. An electrically-driven auxiliary hydraulic pump adds weight, consumes electrical power, requires packaging space, and increases system complexity of a hybrid powertrain system.

SUMMARY

A torque transfer apparatus for a transmission includes a rotatable friction clutch pack including a first friction plate that is contiguous to a second friction plate. The first friction plate is coupled to a first transmission element and the second friction plate is coupled to a second transmission element. A Belleville spring device includes a first periphery and a second periphery. The first periphery mechanically contacts a housing of the transmission and the second periphery mechanically contacts the first friction plate. A hydraulically-activated piston element is mechanically coupled to the Belleville spring device. The Belleville spring device is configured to urge the first friction plate to engage the second friction plate to effect torque transfer therebetween when the hydraulically-activated piston device is deactivated. The hydraulically-activated piston element is configured to urge the second periphery of the Belleville spring device away from the mechanical contact of the first friction plate when the hydraulically-activated piston device is activated.

BRIEF DESCRIPTION OF THE DRAWINGS

One or more embodiments will now be described, by way of example, with reference to the accompanying drawings, in which.

DETAILED DESCRIPTION

Figure 1:
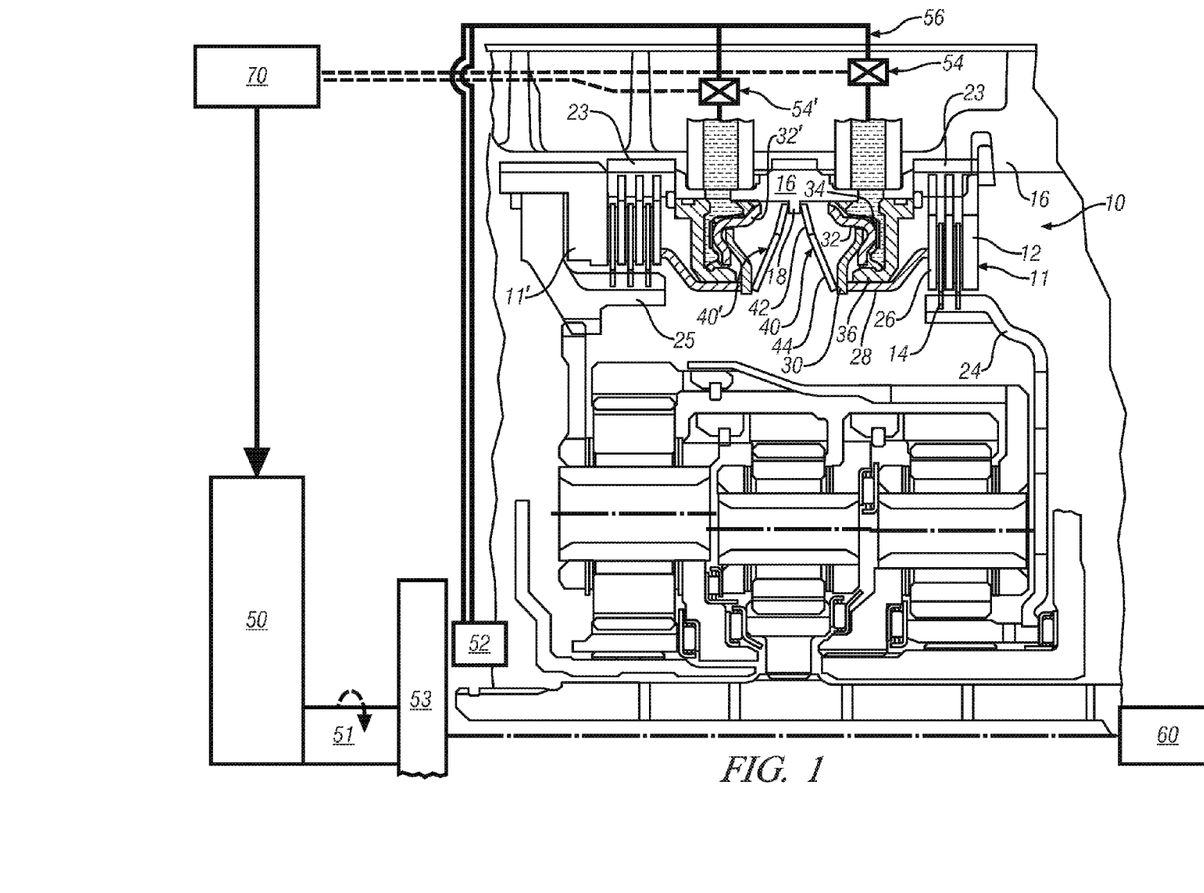
FIG. 1 is a schematic view of a first embodiment of a powertrain system including an internal combustion engine and a transmission with first friction plate(s) engaging second friction plate(s) to activate a friction clutch pack to transfer torque between first and second transmission elements in accordance with the present disclosure.

Referring now to the drawings, wherein the showings are for the purpose of illustrating certain exemplary embodiments only and not for the purpose of limiting the same, FIG. 1 schematically illustrates a hybrid powertrain system including an internal combustion engine 50 coupled via a shaft 51 and torque converter 53 to a transmission 10. A mechanically-driven hydraulic pump 52 is mechanically coupled to the shaft 51, e.g., via meshed gears. The transmission 10 is configured to transfer torque to an output member 60, including torque generated by the internal combustion engine 50 and another torque generator(s), e.g., an electric machine(s). A control module 70 is configured to monitor and control operation of various elements of the hybrid powertrain system. The internal combustion engine 50 is configured to execute an autostop event and an autostart event during ongoing powertrain operation. As is appreciated, an autostop event occurs when engine operation is discontinued and the internal combustion engine is in an off state during ongoing powertrain operation to conserve fuel. As is appreciated, an autostart event is executed subsequent to executing an autostop event to start or restart engine operation during ongoing powertrain operation. As is appreciated, the engine may be started to provide tractive torque to drive wheel(s) and to provide power to a generator device to generate energy that can be used by the other torque generator(s) to generate torque.

In each embodiment described herein, the transmission 10 includes a friction clutch pack 11 having rotatable or non-rotatable friction plate(s) 12 contiguous to and coaxial to a second rotatable friction plate(s) 14. The friction plate(s) 12 is mechanically coupled to a first transmission element 23. In one embodiment, the first transmission element 23 is a rotating element. As shown, the first transmission element 23 is a brake element mechanically coupled to a housing 16 of the transmission 10. The second friction plate(s) 14 is mechanically coupled to a second transmission element 24, e.g., a rotating shaft. The first and second friction plates 12 and 14 are configured to transfer torque between the first and second transmission elements 23 and 24 when a normal force urges the first friction plate(s) 12 to engage the second friction plate(s) 14. It is appreciated that the magnitude of normal force required to urge the first friction plate(s) 12 to physically engage the second friction plate(s) 14 to effect torque transfer between the first and second transmission elements 23 and 24 is related to and dependent upon details of a specific system.

A clutch activation mechanism in the transmission 10 includes a Belleville spring device 40 that is configured to apply a magnitude of normal force to urge the first friction plate(s) 12 to physically engage the second friction plate(s) 14 under specific operating conditions. As is appreciated, when the magnitude of applied normal force is sufficient, the first friction plate(s) 12 physically engages the second friction plate(s) 14 to cause the first and second transmission elements 23 and 24 to rotate in concert, thus activating the friction clutch pack 11. Alternatively, when the first transmission element 23 is a brake element coupled to the housing 16 of transmission 10, when the magnitude of applied normal force is sufficient, the first friction plate(s) 12 physically engages the second friction plate(s) 14 to cause the first and second transmission elements 23 and 24 to not rotate. The first friction plate(s) 12 includes an apply plate 26. A mechanically-driven hydraulic pump 52 provides pressurized hydraulic fluid to a hydraulic circuit 56 that includes at least one solenoid-operated flow control valve 54. The solenoid-operated flow control valve 54 controls fluid flow to a hydraulic chamber 34. Activation of the solenoid-operated flow control valve 54 can cause pressurized hydraulic fluid in the hydraulic circuit 56 to flow to the hydraulic chamber 34, thus urging movement of a piston element 32, which in turn urges the Belleville spring device 40 away from the first friction plate(s) 12. When the Belleville spring 40 discontinues applying a sufficient magnitude of normal force on the first friction plate(s) 12, the first friction plate(s) 12 disengages the second friction plate(s) 14, thus deactivating the friction clutch pack 11 and allowing the second transmission element 24 to freely move relative to the first transmission element 23. A sufficient level of hydraulic pressure applied in the hydraulic chamber 34 is necessary to overcome the normal force applied by the Belleville spring device 40 to deactivate the friction clutch pack 11. The control module 70 can command activation and deactivation of the solenoid-operated flow control valve 54 to activate and deactivate the friction clutch pack 11 when the engine 50 is operating and thus spinning the hydraulic pump 52 to generate hydraulic pressure on systems including a hydraulic circuit that includes a mechanically-driven hydraulic pump without a supplementary hydraulic pump, e.g., a pump that is driven by an electric motor. The piston element 32 is said to be in a deactivated state when no or minimal hydraulic pressure is applied to the hydraulic chamber 34. The piston element 32 is said to be in an activated state when hydraulic pressure applied to the hydraulic chamber 34 is sufficient to overcome the normal force applied by the Belleville spring device 40.

The control module 70 can command activation and deactivation of the solenoid-operated flow control valve 54 to activate and deactivate the piston element 32 to disengage and engage the first and second friction plates 12 and 14, thus deactivating and activating the friction clutch pack 11 when the engine 50 is operating and thus spinning the hydraulic pump 52 to generate hydraulic pressure on systems including a hydraulic circuit that includes a mechanically-driven hydraulic pump without a supplementary hydraulic pump, e.g., a pump that is driven by an electric motor.

The transmission 10 includes an annular sleeve 28 and a reaction ring 30 that are configured to transfer applied normal force originating from the Belleville spring device 40 to the apply plate 26 of the first friction plate(s) 12. The annular sleeve 28 is guided by the inner diameter of a contiguous chamber disk 36 that is attached to the housing 16, and is located between the reaction ring 30 and the apply plate 26 of the first friction plate(s) 12.

The piston element 32 is an annular-shaped device that physically engages the reaction ring 30. The piston element 32 is retained in position by the housing 16 and the chamber disk 36. The hydraulic chamber 34 is formed between the piston element 32 and the chamber disk 36. The Belleville spring device 40 has an annular, truncated conical shape that includes an outer periphery 42 and an inner periphery 44. The outer periphery 42 is in mechanical contact with an inner riser 18 of the first transmission element 23. The inner periphery 44 mechanically contacts the reaction ring 30, allowing the Belleville spring device 40 to apply the normal force on the first friction plate(s) 12 via the apply plate 26 and the annular sleeve 28, unless the Belleville spring 40 has been urged away.

Hydraulic pressure generated in the hydraulic chamber 34 is formed between the piston element 32 and the chamber disk 36, urging the piston element 32 away from the chamber disk 36, and thus urging the second periphery section 44 of the Belleville spring device 40 away from the reaction ring 30.

The Belleville spring device 40 is configured to apply a normal force to urge the first friction plate(s) 12 to engage the second friction plate(s) 14 and activate the friction clutch pack 11 when hydraulic pressure in the hydraulic chamber 34 is less than a threshold.

When no hydraulic pressure is applied in the hydraulic chamber 34, e.g., when the engine 50 is not operating and thus not spinning the hydraulic pump 52 to generate hydraulic pressure, the first friction plate(s) 12 engages the second friction plate(s) 14 to activate the friction clutch pack 11 to transfer torque between the first and second transmission elements 23 and 24. Likewise, when hydraulic pressure in the hydraulic chamber 34 is insufficient to overcome the normal force applied by the Belleville spring device 40 on the first friction plate(s) 12, the friction clutch pack 11 is activated.

When there is sufficient hydraulic pressure in the hydraulic chamber 34 to overcome the normal force applied by the Belleville spring device 40 on the first friction plate(s) 12, the first friction plate(s) 12 disengages the second friction plate(s) 14 and the friction clutch pack 11 is deactivated. In one embodiment, this operating state of deactivating the friction clutch pack 11 can only occur when the engine 50 is operating and thus spinning the hydraulic pump 52 to generate hydraulic pressure when the system includes a hydraulic circuit that includes a mechanically-driven hydraulic pump without a supplementary hydraulic pump, e.g., a pump that is driven by an electric motor.

FIG. 1 schematically depicts the first embodiment of the transmission 10 including the friction clutch pack 11, with the first friction plate(s) 12 engaging the second friction plate(s) 14 to effect torque transfer between the first and second transmission elements 23 and 24 across the friction clutch pack 11. The transmission 10 includes a second friction clutch pack 11' having a second clutch activation mechanism corresponding in detail to the previously described clutch activation mechanism associated with the first friction clutch pack 11. The second clutch activation mechanism includes a second hydraulically-activated piston element 32' mechanically coupled to a second Belleville spring device 40' for engaging and disengaging first and second friction plate(s) of the friction clutch pack 11' to transfer torque between other transmission elements. As depicted, the second friction clutch pack 11' is configured to transfer torque between the first transmission element 23 and a third transmission element 25, e.g., a rotatable element of a planetary gear set. In this embodiment, the hydraulic circuit 56 includes first and second solenoid-operated flow control valves 54 and 54' that are individually controlled by the control module 70. The first solenoid-operated flow control valve 54 controls flow of pressurized hydraulic fluid to activate and deactivate the friction clutch pack 11 and the second solenoid-operated flow control valve 54' controls flow of pressurized hydraulic fluid to activate and deactivate the second friction clutch pack 11'.

Figure 2:
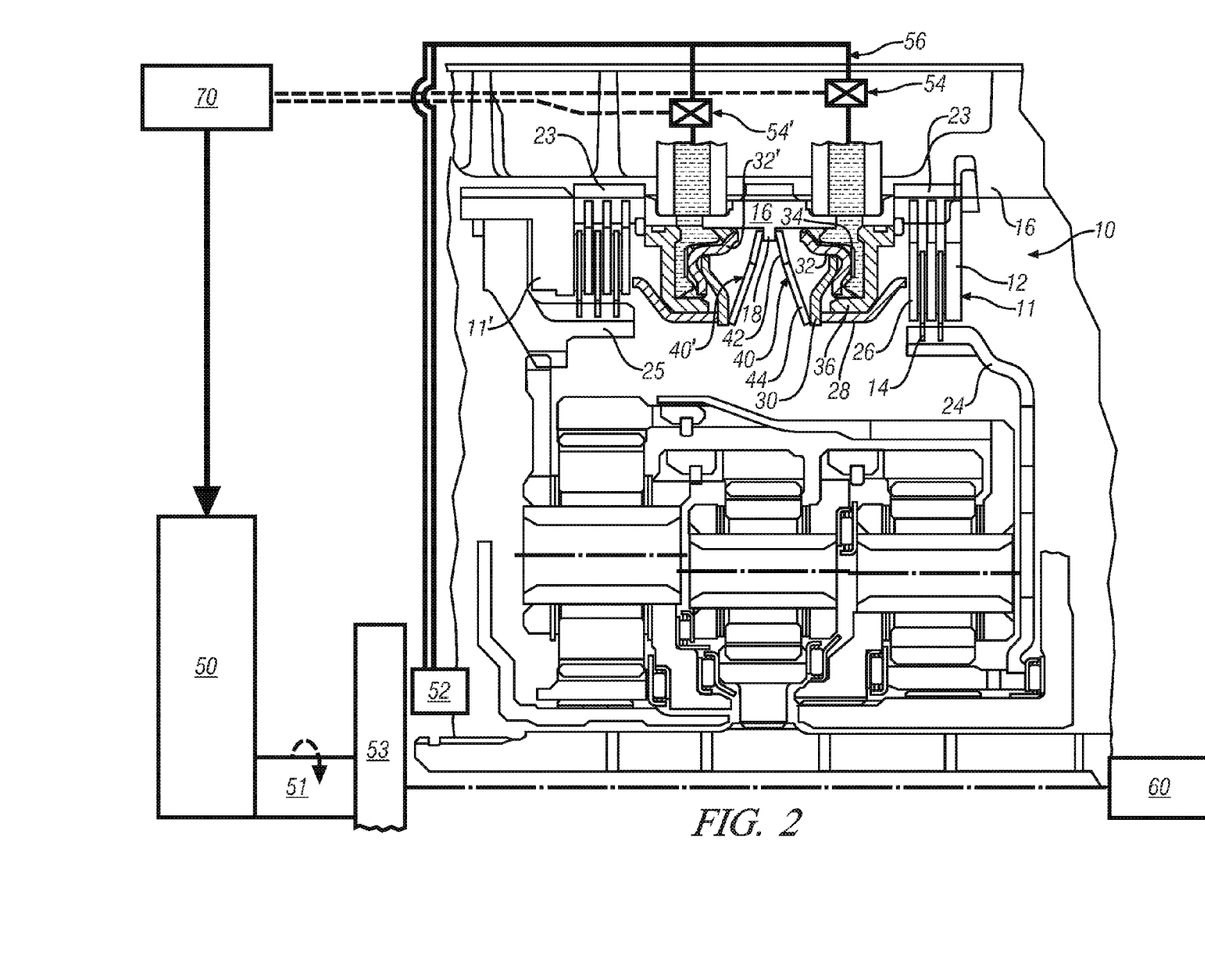
FIG. 2 is a schematic view of the first embodiment of a powertrain system including an internal combustion engine and a transmission with first friction plate(s) disengaged from second friction plate(s) to deactivate a friction clutch pack in accordance with the present disclosure.

FIG. 2 schematically depicts the first embodiment of the transmission 10 with the first friction plate(s) 12 disengaged from the second friction plate(s) 14 to deactivate the friction clutch pack 11 with no torque transfer between the first and second transmission elements 23 and 24.

FIGS. 3, 4, 5 and 6 schematically depict a second embodiment of the powertrain system including the internal combustion engine 50 coupled to the transmission 10, including the Belleville spring 40 configured to directly apply a normal force to the apply plate 26 of the first friction plate(s) 12. The Belleville spring device 40 has an annular, truncated conical shape that includes the outer periphery 42 and the inner periphery 44. A third transmission element 22, which is a rotating element in one embodiment, includes a recess portion 31 into which the piston element 32 is inserted with hydraulic chamber 34' formed between the recess portion 31 and the piston element 32. An annular ring device 33 is assembled onto the transmission element 22 substantially near the recess portion 31 and the piston element 32 and is held in place by a retaining ring 35. A second recess area 37 is formed and is defined by the annular ring device 33, a portion of the third transmission element 22, and the piston element 32. The third transmission element 22 and the first transmission element 23 are rotatably coupled.

In this embodiment, the Belleville spring device 40 is assembled into the second recess area 37 such that the inner periphery 44 is in mechanical contact with the piston element 32. The outer periphery 42 can mechanically contact the apply plate 26 of the first friction plate(s) 12 to apply normal force on the first friction plate(s) 12. The annular ring device 33 provides a fulcrum point 39 for the Belleville spring device 40. The piston element 32 is retained in place by the Belleville spring device 40. In this embodiment, the piston element 32 is an annular-shaped device that engages the inner periphery 44 of the Belleville spring device 40. The Belleville spring device 40 is configured to apply the normal force to urge the first friction plate(s) 12 to engage the second friction plate(s) 14 when hydraulic pressure is less than a threshold. When no hydraulic pressure is applied, e.g., when the engine 50 is not operating and thus not spinning the hydraulic pump 52 to generate hydraulic pressure, the first friction plate(s) 12 engages the second friction plate(s) 14 to activate the friction clutch pack 11 to transfer torque between the first and second transmission elements 22 and 24.

Hydraulic pressure generated in the hydraulic chamber 34' is formed between the piston element 32 and the recess portion 31, and urges the piston element 32 away from the recess portion 31, thus urging the inner periphery 44 towards the annular ring device 33 and pivoting the Belleville spring device 40 such that the outer periphery 42 of the Belleville spring device 40 is urged away from the apply plate 26. When sufficient hydraulic pressure is applied in the hydraulic chamber 34' to overcome the normal force applied by the Belleville spring device 40 on the first friction plate(s) 12, the friction clutch pack 11 is deactivated. This operating state of deactivating the friction clutch pack 11 only occurs when the engine 50 is operating and thus spinning the hydraulic pump 52 to generate hydraulic pressure when the system includes a hydraulic circuit that includes a mechanically-driven hydraulic pump without a supplementary hydraulic pump, e.g., a pump that is driven by an electric motor. When sufficient hydraulic pressure is applied in the hydraulic chamber 34' to overcome the normal force applied by the Belleville spring device 40 on the first friction plate(s) 14, the friction clutch pack 11 is disengaged.

Figure 3:
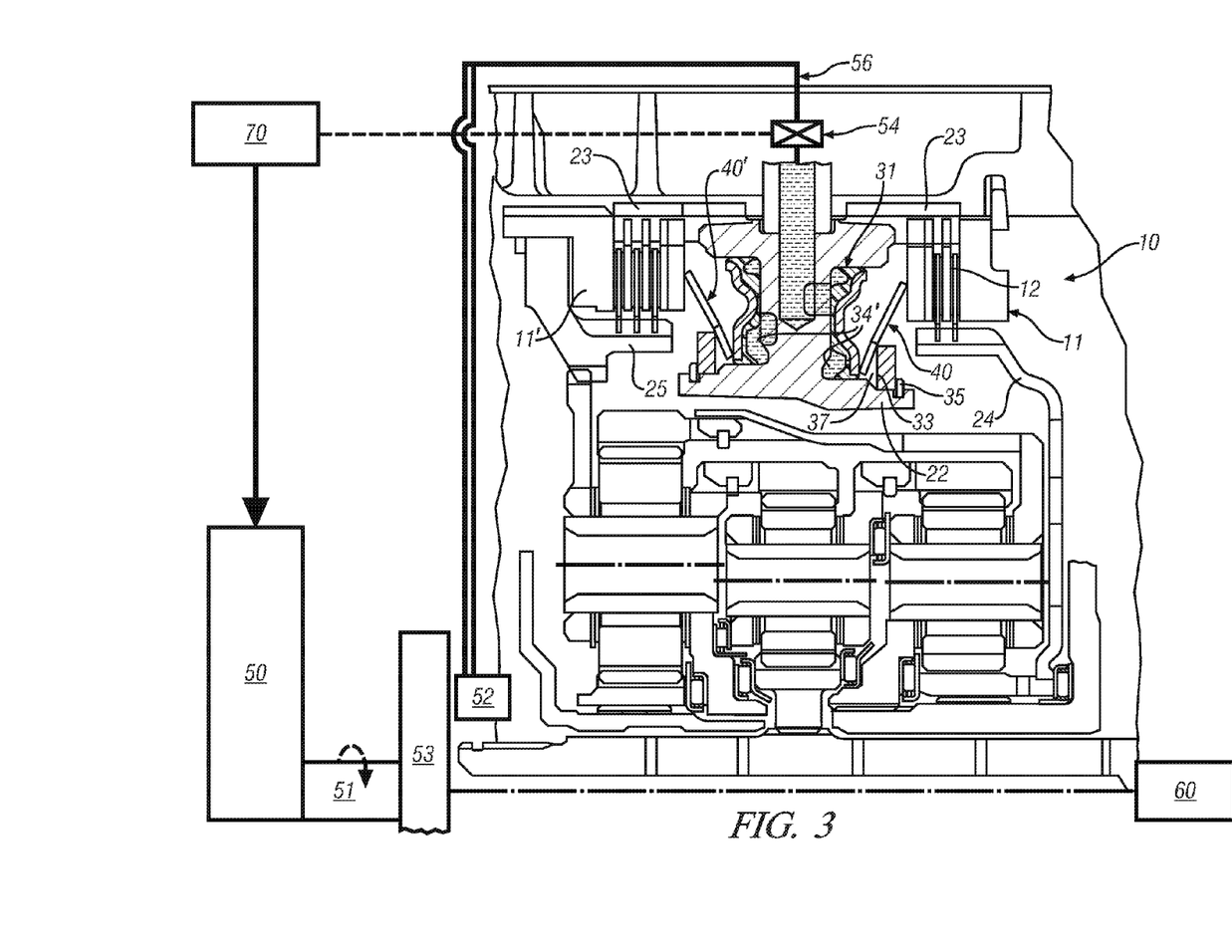
FIGS. 3 and 4 are schematic views of a second embodiment of a powertrain system including an internal combustion engine and a transmission with first friction plate(s) engaging second friction plate(s) to activate a friction clutch pack to transfer torque between first and second transmission elements in accordance with the present disclosure.
Figure 4:
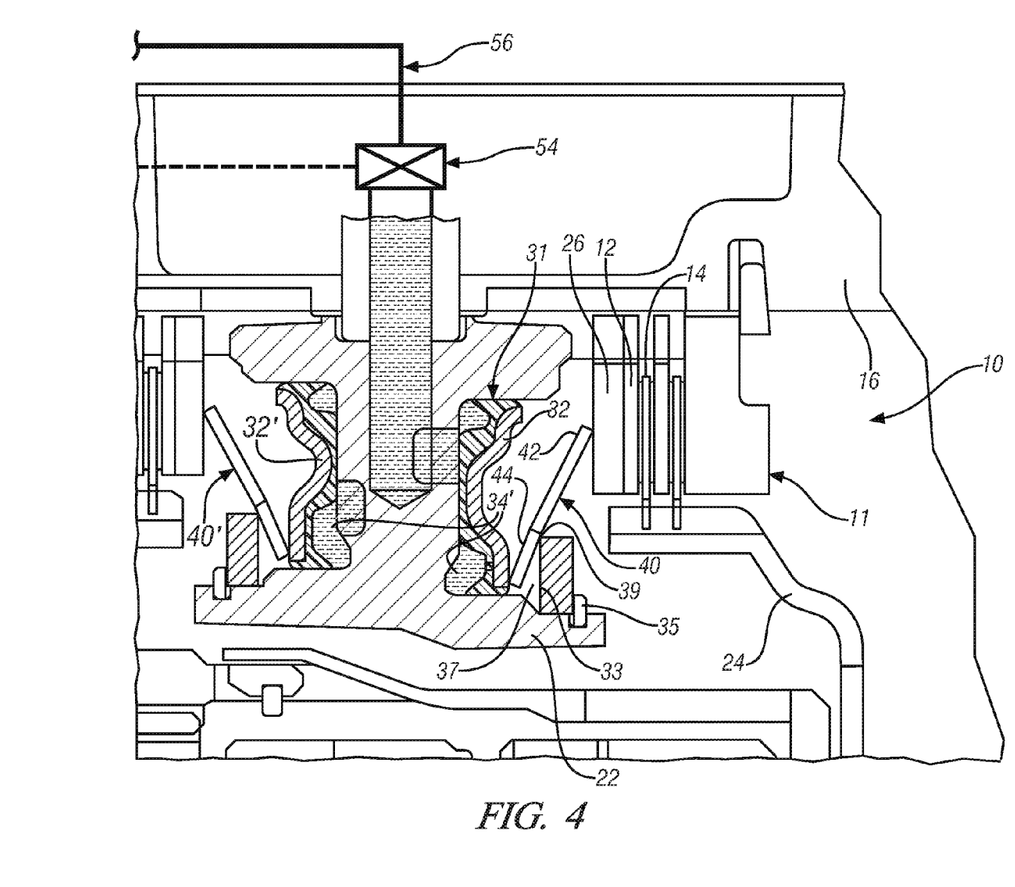

FIGS. 3 and 4 depict the second embodiment of the transmission 10 with the first friction plate(s) 12 engaging the second friction plate(s) 14 to activate the friction clutch pack 11 to transfer torque between the first and second transmission elements 22 and 24. The transmission 10 includes the second friction clutch pack 11' that has been previously described. In this embodiment, the hydraulic circuit 56 includes a single one of the solenoid-operated flow control valves 54 that is controlled by the control module 70. The single solenoid-operated flow control valve 54 controls flow of pressurized hydraulic fluid to simultaneously activate and deactivate both the friction clutch pack 11 and the second friction clutch pack 11'.

Figure 5:
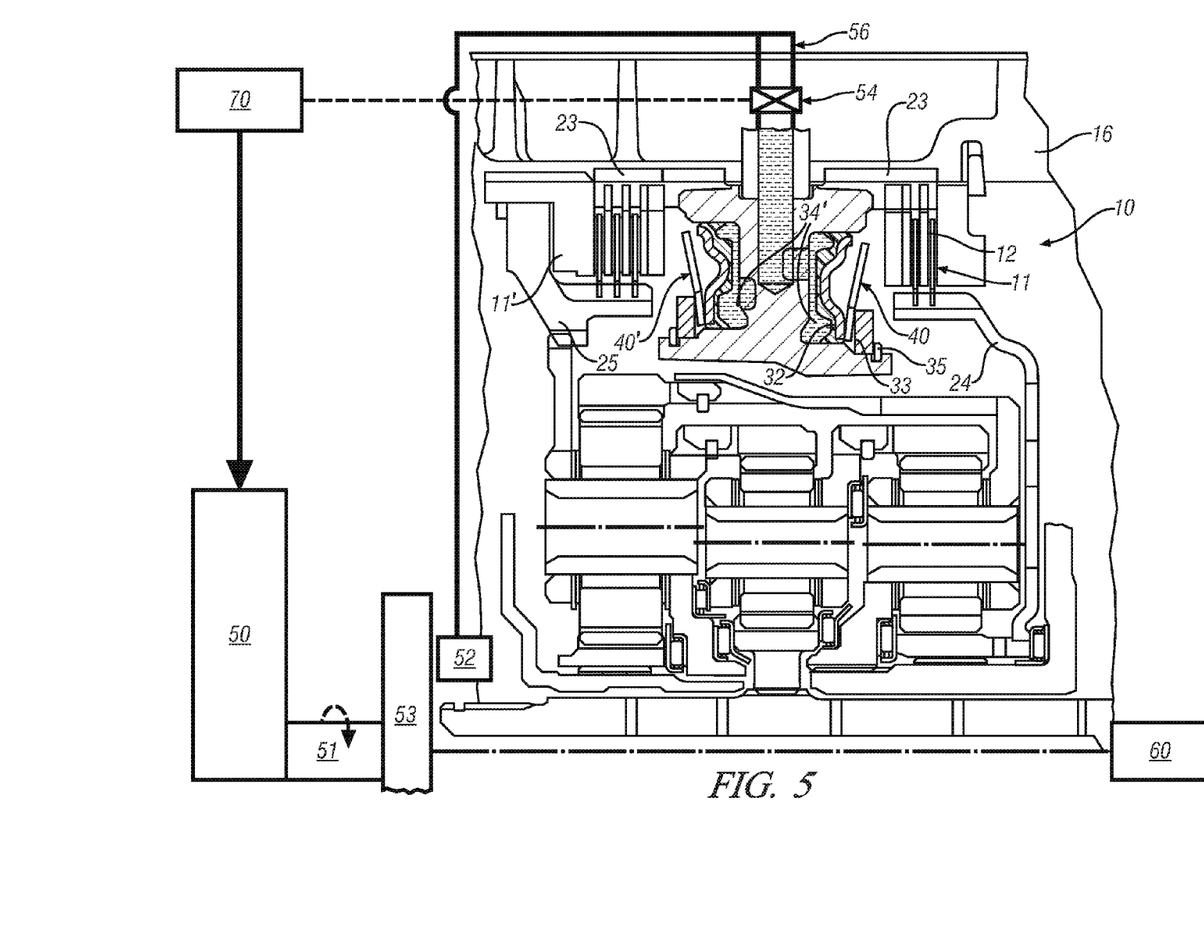
FIGS. 5 and 6 are schematic views of the second embodiment of a powertrain system including an internal combustion engine and a transmission with first friction plate(s) disengaged from second friction plate(s) to deactivate a friction clutch pack to transfer torque between first and second transmission elements in accordance with the present disclosure.
Figure 6:
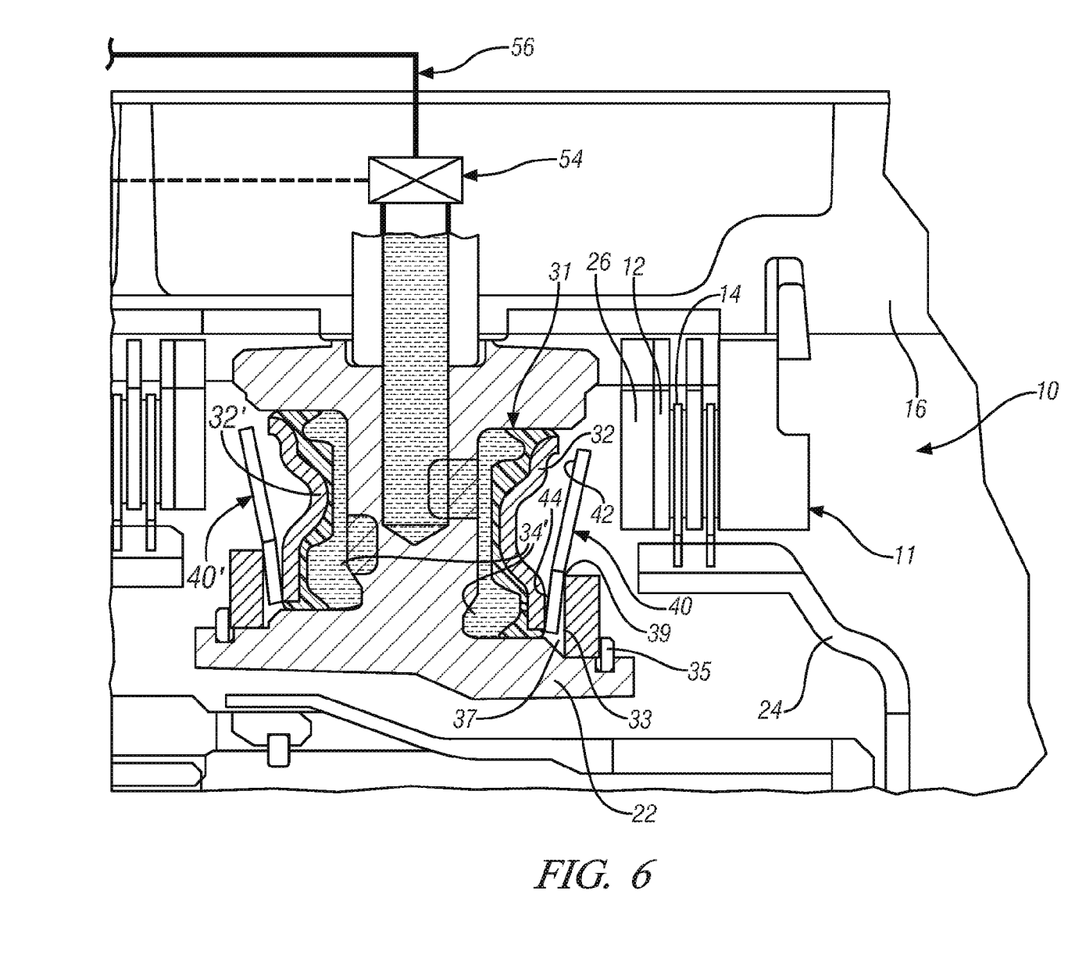

FIGS. 5 and 6 depict the second embodiment of the transmission 10 with the first friction plate(s) 12 disengaged from the second friction plate(s) 14 to deactivate the friction clutch pack 11 with no torque transfer between the first and second transmission elements 22 and 24.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A torque transfer apparatus for a transmission, including
a rotatable friction clutch pack including a first friction plate contiguous to a second friction plate, the first friction plate coupled to a first transmission element and the second friction plate coupled to a second transmission element;
a Belleville spring device including a first periphery and a second periphery, the first periphery mechanically contacting a housing of the transmission, the second periphery mechanically contacting the first friction plate;
a hydraulically-activated piston element mechanically coupled to the Belleville spring device;
the Belleville spring device configured to urge the first friction plate to engage the second friction plate to effect torque transfer therebetween when the hydraulically-activated piston element is deactivated; and
the hydraulically-activated piston element configured to urge the second periphery of the Belleville spring device away from the mechanical contact with the first friction plate when the hydraulically-activated piston element is activated.

2. The apparatus of claim 1, wherein the first friction plate is coupled to the first transmission element comprising the housing of the transmission and the second friction plate is coupled to the second transmission element comprising a rotating element.

3. The apparatus of claim 1, wherein the first friction plate is coupled to a first rotating transmission element and the second friction plate is coupled to the second transmission element comprising a rotating element.

4. The apparatus of claim 1, wherein the first periphery of the Belleville spring device comprises an inner periphery and the second periphery of the Belleville spring device comprises an outer periphery.

5. The apparatus of claim 4, wherein the inner periphery of the Belleville spring device mechanically contacts a reaction ring that mechanically contacts the hydraulically-activated piston element and the outer periphery of the Belleville spring device mechanically contacts the housing of the transmission.

6. The apparatus of claim 1, wherein the first periphery of the Belleville spring device comprises an outer periphery and the second periphery of the Belleville spring device comprises an inner periphery.

7. The apparatus of claim 6, wherein the inner periphery of the Belleville spring device contacts the housing of the transmission and the outer periphery of the Belleville spring device mechanically contacts an apply plate of the first friction plate.

8. A torque transfer apparatus for a transmission, comprising:
  a first friction clutch pack having a first friction plate contiguous to and coaxial to a second friction plate, the first friction plate mechanically coupled to a first transmission element and the second friction plate mechanically coupled to a second transmission element, wherein the first and second friction plates transfer torque between the first and second transmission elements when the first friction plate engages the second friction plate;
  a Belleville spring device including a first periphery and a second periphery, the first periphery mechanically contacting a housing of the transmission, the second periphery mechanically contacting the first friction plate;
  a hydraulically-activated piston element mechanically coupled to the Belleville spring device;
  the Belleville spring device configured to urge the first friction plate to engage the second friction plate to effect torque transfer therebetween when the hydraulically-activated piston element is deactivated; and
  the hydraulically-activated piston element configured to urge the second periphery of the Belleville spring device away from the mechanical contact with the first friction plate when the hydraulically-activated piston element is activated.

9. The apparatus of claim 8, further comprising a flow control valve configured to control fluid flow to a hydraulic chamber to activate and deactivate the hydraulically-activated piston element mechanically coupled to the Belleville spring device.

10. The apparatus of claim 8, further comprising:
  a second friction clutch pack having a first friction plate contiguous to and coaxial to a second friction plate, the first friction plate mechanically coupled to the first transmission element and the second friction plate mechanically coupled to a third transmission element, wherein the first and second friction plates transfer torque between the first and third transmission elements when the first friction plate engages the second friction plate;
  a second Belleville spring device including a first periphery and a second periphery, the first periphery mechanically contacting the housing of the transmission, the second periphery mechanically contacting the first friction plate;
  a second hydraulically-activated piston element mechanically coupled to the second Belleville spring device;
  the second Belleville spring device configured to urge the first friction plate to engage the second friction plate to effect torque transfer therebetween when the second hydraulically-activated piston element is deactivated; and
  the second hydraulically-activated piston element configured to urge the second periphery of the second Belleville spring device away from the mechanical contact of the first friction plate when the hydraulically-activated piston element is activated.

11. The apparatus of claim 10, further comprising a single solenoid-operated flow control valve configured to control flow of pressurized hydraulic fluid to activate and deactivate both the hydraulically-activated piston element mechanically coupled to the Belleville spring device corresponding to the first friction clutch pack and the second hydraulically-activated piston element mechanically coupled to the second Belleville spring device.

12. The apparatus of claim 10, further comprising a first solenoid-operated flow control valve configured to control flow of pressurized hydraulic fluid to activate and deactivate the hydraulically-activated piston element mechanically coupled to the Belleville spring device corresponding to the first friction clutch pack and a second solenoid-operated flow control valve configured to control flow of pressurized hydraulic fluid to activate and deactivate the second hydraulically-activated piston element mechanically coupled to the second Belleville spring device.

* * * * *